United States Patent
Kusumi

(10) Patent No.: US 9,947,083 B2
(45) Date of Patent: Apr. 17, 2018

(54) IMAGE PROCESSING METHOD, IMAGE PROCESSING APPARATUS, IMAGE CAPTURING APPARATUS, IMAGE PROCESSING PROGRAM AND NON-TRANSITORY COMPUTER-READABLE STORAGE MEDIUM

(71) Applicant: CANON KABUSHIKI KAISHA, Tokyo (JP)

(72) Inventor: Yuichi Kusumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 15/106,896

(22) PCT Filed: Feb. 27, 2015

(86) PCT No.: PCT/JP2015/056583
§ 371 (c)(1),
(2) Date: Jun. 21, 2016

(87) PCT Pub. No.: WO2015/133593
PCT Pub. Date: Sep. 11, 2015

(65) Prior Publication Data
US 2016/0343115 A1    Nov. 24, 2016

(30) Foreign Application Priority Data

Mar. 4, 2014    (JP) .................................. 2014-041541

(51) Int. Cl.
G06K 9/40     (2006.01)
G06T 5/00     (2006.01)
G06T 5/20     (2006.01)

(52) U.S. Cl.
CPC .............. G06T 5/002 (2013.01); G06T 5/20 (2013.01); G06T 2207/20012 (2013.01);
(Continued)

(58) Field of Classification Search
None
See application file for complete search history.

(56) References Cited

U.S. PATENT DOCUMENTS 7,876,973 B2 *    1/2011    Fairbanks ................. G06T 5/20
358/463
2003/0194150 A1 *  10/2003   Berkner .................. G06T 3/403
382/300
(Continued)

FOREIGN PATENT DOCUMENTS

JP    2007272536 A    10/2007
JP    2013201724 A    10/2013

OTHER PUBLICATIONS

International Search Report issued in Intl. Appln. No. PCT/JP2015/056583 dated Jun. 2, 2015.
(Continued)

Primary Examiner — Randolph I Chu
(74) Attorney, Agent, or Firm — Rossi, Kimms & McDowell LLP

(57) ABSTRACT

The image processing method includes acquiring an input image produced by image capturing using an optical system, acquiring a first noise amount contained in the input image, performing a resolution enhancement process on the input image, performing frequency decomposition of the input image into multiple decomposed images that are mutually different frequency band components, and calculating, on a basis of the first noise amount and a frequency characteristic of the resolution enhancement process, a second noise amount contained in each of areas of each of the multiple decomposed images. The method further includes performing a noise reduction process on each area of each decomposed image on a basis of the second noise amount calculated for that area, and combining the multiple decomposed images each subjected to the noise reduction process together.

14 Claims, 5 Drawing Sheets

(52) U.S. Cl.
CPC ............... *G06T 2207/20016* (2013.01); *G06T 2207/20021* (2013.01); *G06T 2207/20064* (2013.01)

(56) References Cited

U.S. PATENT DOCUMENTS

| | | |
|---|---|---|
| 2007/0165961 A1 | 7/2007 | Lu |
| 2008/0266432 A1 | 10/2008 | Tsuruoka |
| 2009/0252430 A1* | 10/2009 | Hou .................. G06T 5/002 382/254 |
| 2011/0188583 A1* | 8/2011 | Toraichi ............. G06T 5/002 375/240.27 |
| 2013/0208129 A1* | 8/2013 | Stenman ............. G06T 5/002 348/207.1 |
| 2014/0044375 A1* | 2/2014 | Xu ..................... G06T 5/00 382/260 |
| 2014/0280417 A1* | 9/2014 | DeGarrido ........ H03H 17/0248 708/322 |
| 2017/0169276 A1* | 6/2017 | Agaian ............... G06K 9/0014 |

OTHER PUBLICATIONS

Written Opinion issued in Intl. Appln. No. PCT/JP2015/056583 dated Jun. 2, 2015.
Neelamani et al. "ForWaRD: Fourier-Wavelet Regularized Deconvolution for Ill-Conditioned Systems." IEEE Transactions on Signal Processing. Feb. 2004: 418-433. vol. 52, No. 2.

\* cited by examiner

IMAGE PROCESSING METHOD, IMAGE PROCESSING APPARATUS, IMAGE CAPTURING APPARATUS, IMAGE PROCESSING PROGRAM AND NON-TRANSITORY COMPUTER-READABLE STORAGE MEDIUM

TECHNICAL FIELD

The present invention relates to an image processing technique for reducing a noise contained in an image produced by image capturing and particularly to a technique for reducing a noise contained in an image subjected to a resolution enhancement process.

BACKGROUND ART

Light emitted from a point of an object and passing through an optical system cannot be converged to one point due to diffraction or aberration of the optical system and therefore has a slight spread. A light distribution with such a slight spread is called a point spread function (PSF). An image produced by image capturing using an image capturing optical system corresponds to one formed by convolution of an ideal object image with the PSF and thus has a degraded resolution (blur).

For this reason, a resolution enhancement process to correct such a degraded image is often performed. One example of the resolution enhancement process is an image restoration process. The image restoration process is performed by, for example, convoluting an image to be corrected (input image) with an image restoration filter having an inverse characteristic to that of an optical transfer function (OTF) of the image capturing optical system. The OTF can be acquired by performing a Fourier transform on the PSF.

However, the image restoration process may amplify a noise generated in an image capturing apparatus (image sensor) used for the image capturing and therefore contained in the degraded image or generate ringing. For this reason, it is difficult to produce a good high-resolution image with the resolution enhancement process by the image restoration process simply using an image restoration filter having a characteristic inverse to that of the OTF. An image restoration method that can solve such a problem is known which uses a Wiener filter capable of controlling a degree of restoration depending on an intensity ratio (SNR) of an image signal to a noise signal. The Wiener filter is provided with an adjustment term (amplification factor adjustment term) to control an amplification factor of the noise.

However, setting the amplification factor adjustment term of the Wiener filter such that the amplification factor increases can improve a resolution enhancement effect of the image restoration process, but significantly amplifies the noise. On the other hand, setting the amplification factor adjustment term such that the amplification factor decreases can suppress the noise amplification, but decreases the resolution enhancement effect.

As methods of performing a noise reduction process on a high-resolution image produced by the resolution enhancement process to produce an image having a high resolution and less noise, Patent Literature 1 and Non-Patent Literature 1 disclose methods using a wavelet transform. The method disclosed in Patent Literature 1 reduces, in a wavelet space, a noise generated when a blur correction is performed as the resolution enhancement process. The method disclosed in Non-Patent Literature 1 performs, when an image restoration process as the resolution enhancement process is performed on an entire image, a noise reduction process uniformly on the entire image in the wavelet space on a basis of a frequency characteristic of the resolution enhancement process to reduce a noise amplified by the resolution enhancement process

CITATION LIST

Patent Literature

[PTL 1] United States Patent Publication No. 2007-0165961

Non Patent Literature

[NPL 1] R. Neelamani et al., "ForWaRD: Fourier-Wavelet Regularized Deconvolution for Ill-Conditioned Systems", IEEE Transactions on Signal Processing, Vol. 52, No. 2 (2004)

SUMMARY OF INVENTION

Technical Problem

However, while the blur correction as the resolution enhancement process disclosed in Patent Literature 1 is performed on a blur uniformly appearing in the entire image, the degradation caused by the image capturing optical system is not uniform in the entire image, which requires performing the resolution enhancement process on each of areas in the image. Patent Literature 1 does not disclose a method of reducing a noise amplified by the resolution enhancement process performed on each area in the image.

Moreover, when the resolution enhancement process is performed on each area in the image, the noise reduction process performed uniformly on the entire image as disclosed in Non-Patent Literature 1 generates a remaining noise and a blur depending on an amplification amount of the noise generated by the resolution enhancement process performed on each area.

The present invention provides an image processing method, an image processing apparatus and others each capable of effectively reducing a noise amplified by a resolution enhancement process even when the resolution enhancement process is performed on each area of an image.

Solution to Problem

The present invention provides as an aspect thereof an image processing method including acquiring an input image produced by image capturing using an optical system, acquiring a first noise amount contained in the input image, performing a resolution enhancement process on the input image, performing frequency decomposition of the input image into multiple decomposed images that are mutually different frequency band components, calculating, on a basis of the first noise amount and a frequency characteristic of the resolution enhancement process, a second noise amount contained in each of areas of each of the multiple decomposed images, performing a noise reduction process on each area of each decomposed image on a basis of the second noise amount calculated for that area, and combining the multiple decomposed images each subjected to the noise reduction process together.

The present invention provides as another aspect thereof an image processing apparatus configured to perform processing including the steps of acquiring an input image produced by image capturing using an optical system, acquiring a first noise amount contained in the input image, performing a resolution enhancement process on the input image, performing frequency decomposition of the input image into multiple decomposed images that are mutually different frequency band components, calculating, on a basis of the first noise amount and a frequency characteristic of the resolution enhancement process, a second noise amount contained in each of areas of each of the multiple decomposed images, performing a noise reduction process on each area of each decomposed image on a basis of the second noise amount calculated for that area, and combining the multiple decomposed images each subjected to the noise reduction process together.

The present invention provides as still another aspect thereof an image capturing apparatus including an image sensor configured to produce an input image by image capturing through an optical system, and the above image processing apparatus.

The present invention provides as yet another aspect thereof an image processing program configured to cause a computer to execute processing corresponding to the above image processing method or a non-transitory computer-readable storage medium storing an image processing program to cause a computer to execute the processing.

Further features and aspects of the present invention will become apparent from the following description of exemplary embodiments with reference to the attached drawings.

Advantageous Effects of Invention

The present invention performs the noise reduction process on each of areas of each of the multiple images provided by frequency decomposition of the input image subjected or to be subjected to the resolution enhancement process and then combines the multiple images subjected to the noise reduction process together. Therefore, the present invention can effectively reduce a noise amplified by the resolution enhancement process even when the resolution enhancement process is performed on each of areas of the input image.

DESCRIPTION OF EMBODIMENTS

Figure 1:
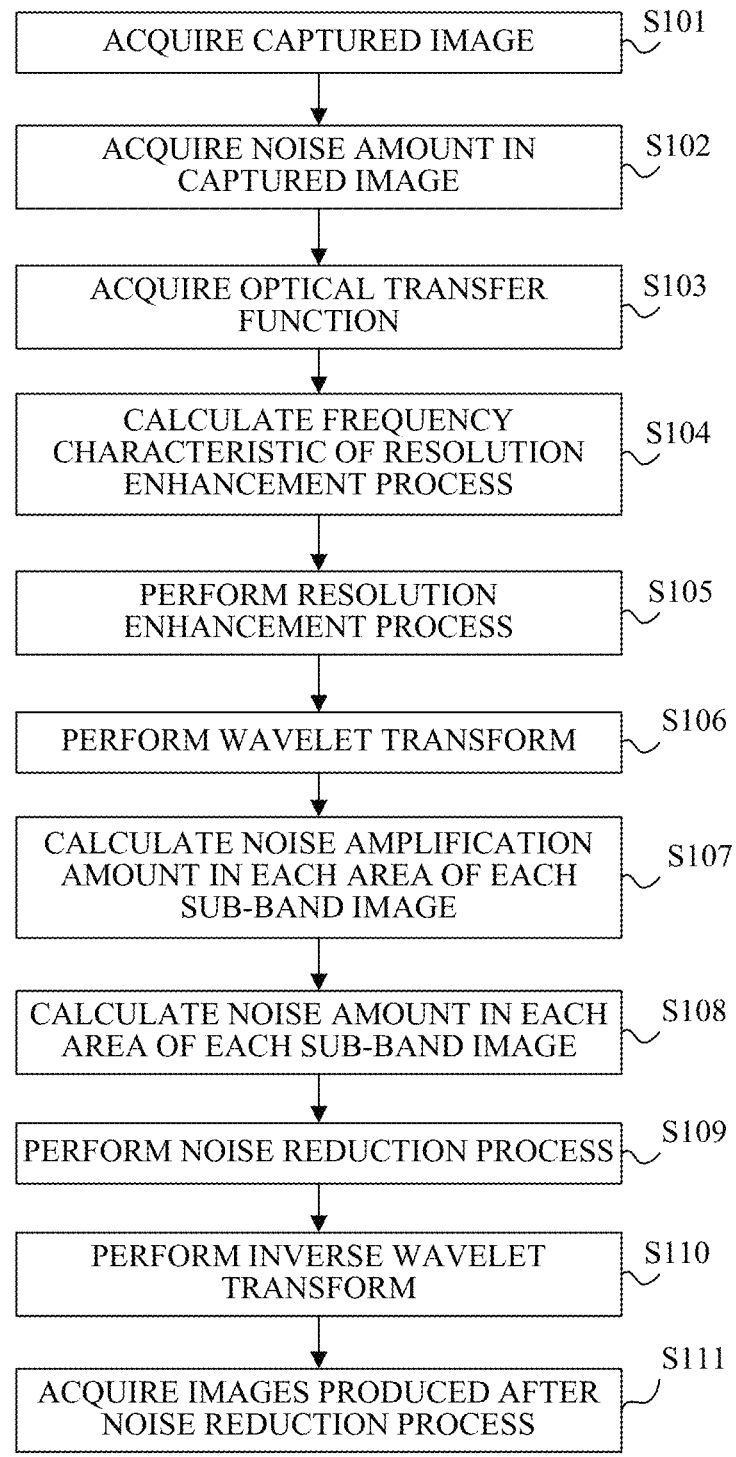
FIG. 1 is a flowchart illustrating an image processing method that is Embodiment 1 of the present invention.

Embodiments of the present invention will be described below with reference to the attached drawings.

First, description will be made of underlying techniques of embodiments of the present invention. As one of resolution enhancement processes for correcting degradation of a captured image (hereinafter also referred to as "an input image") produced by image capturing using an image capturing optical system (hereinafter also simply referred to as "an optical system"), the degradation being caused by diffraction and aberration generated by the optical system, the following image restoration process is performed.

When, in a real space (x,y), f(x,y) represents an original image not degraded by the optical system, h(x,y) represents a point spread function (PSF) of the optical system, and g(x,y) represents a degraded image, a relation among them is expressed by the following expression (1):

$$g(x,y)=\iint f(X,Y)\cdot h(x-X,y-Y)dXdY \quad (1)$$

Performing a Fourier transform on expression (1) to transform it from the real space (x,y) into a frequency space (u,v) derives the following expression (2):

$$G(u,v)=F(u,v)\cdot H(u,v) \quad (2)$$

In expression (2), F(u,v) represents a Fourier transform of the original image f(x,y), G(u,v) represents a Fourier transform of the degraded image g(x,y), and H(u,v) represents a Fourier transform of the PSF h(x,y). That is, H(u,v) represents an optical transfer function (OTF).

Furthermore, transforming expression (2) derives the following expression (3):

$$F(u,v)=G(u,v)/H(u,v) \quad (3)$$

Expression (3) shows that division of G(u,v) representing the Fourier transform of the degraded image g(x,y) by H(u,v) representing the Fourier transform of the PSF h(x,y) in the frequency space can provide F(u,v) representing the Fourier transform of the non-degraded original image f(x,y). Therefore, performing an inverse Fourier transform on F(u,v) enables providing the non-degraded original image f(x,y).

However, actually performing the above-described image process to produce the non-degraded original image is highly likely to significantly amplify a noise generated by an image sensor or to generate ringing in the produced image. Because of such adverse effects caused by the above-described image process, it is difficult to produce a good image with the method of simply using a characteristic inverse to that of the OTF. In order to overcome this difficulty, a method using a Wiener filter expressed by expression (4) is known as an image restoration method for suppressing the noise amplification.

As described above, H(u,v) represents the OTF of the optical system, and $\Gamma$ represents a constant for reducing a noise amplification amount. In other words, even if no noise is generated in a target image to be subjected to the image restoration process, an excessively large amplification factor makes it prone to adverse effects such as the ringing and an edge fall (undershoot). For this reason, it can be said that the constant $\Gamma$ can be utilized as an adjustment term to control the amplification factor. Alternatively, the constant $\Gamma$ may be replaced by $\Gamma(u,v)$ serving as an adjustment term having a frequency characteristic. In the following description, $\lambda^f(u,v)$ is referred to as a frequency characteristic of a resolution enhancement process", and $\Gamma$ is referred to as "an amplification factor adjustment term".

$$\lambda^f(u,v) = \frac{1}{H(u,v)} \frac{|H(u,v)|^2}{(|H(u,v)|^2+\Gamma)} \quad (4)$$

On the other hand, the OTF H(u,v) of the optical system is different in areas (hereinafter referred to as "image areas") of an image plane, that is, of the input image. Therefore, the frequency characteristic $\lambda^f(u,v)$ of the resolution enhancement process expressed by expression (4) may be set differently in the respective image areas. In this description, the image area includes an area corresponding to one pixel.

Multiplying G(u,v) that is the Fourier transform of the degraded image g(x,y) by expression (4) enables reducing a phase component of the PSF caused by the diffraction or aberration generated by the optical system and enables amplifying a frequency characteristic of an amplitude component, which makes it possible to produce a high-resolution and good image. That is, when R(u,v) represents frequency space information on an image restored by the image restoration process using the Wiener filter, the following expression (5) is given:

$$R(u,v) = G(u,v) \cdot \mathcal{R}(u,v) \quad (5)$$

Increasing the amplification factor by adjusting the amplification factor adjustment term $\Gamma$ of the Wiener filter enhances an effect of the resolution enhancement process, but significantly amplifies the noise. On the other hand, decreasing the amplification factor by adjusting the amplification factor adjustment term $\Gamma$ makes it possible to suppress the noise amplification, but decreases the effect of the resolution enhancement process.

Thus, performing a noise reduction process on the high-resolution image acquired by performing the resolution enhancement process enables producing a high-resolution and good image. As a method therefor, a method using the above-described wavelet transform is known.

The wavelet transform is a method of performing, by using localized small waves (wavelets), frequency analysis at each of positions in an image to decompose an image signal thereat into a high-frequency component and a low-frequency component. The wavelet transform performing the frequency analysis at each position in the image enables expressing information in both a frequency domain and a space domain and thus is effective for processes different at positions in the image.

As expressed by expression (6), the wavelet transform performs convolution of a signal f(x) with a basis function $\psi(x)$ spatially localized.

$$w(a,b) = \frac{1}{\sqrt{a}} \int f(x) \psi\left(\frac{x-b}{a}\right) dX \quad (6)$$

The basis function $\psi(x)$ expressed by expression (7) includes a scale parameter a corresponding to a position in a frequency direction and a shift parameter b corresponding to a position in a spatial direction.

$$\psi(x) = \frac{1}{\sqrt{a}} \psi\left(\frac{x-b}{a}\right) \quad (7)$$

On the other hand, a discrete wavelet transform uses a basis function $\psi(x)$ in which the scale parameter a and the shift parameter b are discrete as expressed by expression (8):

$$\psi_{j,k}(x) = 2^{j/2} \psi(2^j x - k) \quad (8)$$

where j represents a wavelet transform level, and k represents a position parameter.

Moreover, a discrete wavelet transform expressed by expression (9) expresses information by using a basis function composed of a pair of a scaling function $\varphi$ and a wavelet function $\psi$ each forming an orthonormal basis. The scaling function $\varphi$ and the wavelet function $\psi$ are respectively given by sequences, that is, respectively express the information using a scaling sequence $p_k$ and a wavelet sequence $q_k$.

$$s_{j,k} = \sum_n p_{n-2k} s_{j-1,n} \quad (9)$$

$$w_{j,k} = \sum_n q_{n-2k} s_{j-1,n}$$

In expression (9), $s_{j,k}$ represents a scaling coefficient that is a low-frequency component, and $w_{j,k}$ represents a wavelet coefficient that is a high-frequency component.

A large number of the basis functions are proposed. The wavelet transform is performed by selecting anyone of the basis functions and using its scaling sequence $p_k$. The wavelet sequence $q_k$ can be derived from a two-scale relation expressed by expression (10) using the scaling sequence $p_k$.

$$q_k = (-1)^k p_{1-k} \quad (10)$$

Figure 3:
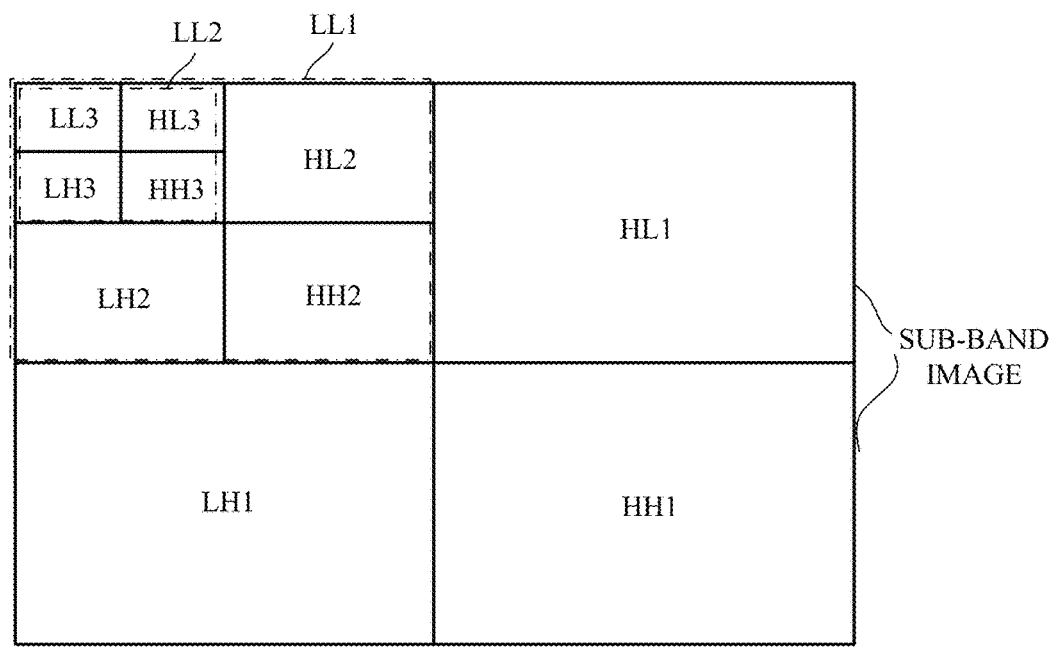
FIG. 3 illustrates an example of multiple sub-band images produced by performing frequency decomposition with a wavelet transform on an image subjected to a resolution enhancement process in Embodiment 1.

In the wavelet transform for an image, a wavelet transform is performed on the image (original image) in its horizontal direction to decompose the original image into a low-frequency component (hereinafter also referred to as "a low-frequency band component") and a high-frequency component (hereinafter also referred to as "a high-frequency band component"), and another wavelet transform is performed on the low-frequency and high-frequency band components acquired by the decomposition in their vertical direction. By these wavelet transforms, as shown in FIG. 3, the original image is decomposed into four partial images, that is, frequency decomposition of the original image into four sub-band images (LL1, LH1, HL1 and HH1) whose frequency bands are mutually different is performed. In FIG. 3, the sub-band image LL1 illustrated in an upper left part is an image of the low-frequency band component (scaling coefficient), and the sub-band image HH1 illustrated in a lower right part is an image of the high-frequency band component (wavelet coefficient). The sub-band image HL1 illustrated in an upper right part is an image of the high-frequency band component extracted in the horizontal direction and the low-frequency band component extracted in the vertical direction. The sub-band image LH1 illustrated in a lower left part is an image of the low-frequency band component extracted in the horizontal direction and the high-frequency band component extracted in the vertical direction.

Furthermore, performing the wavelet transform on the sub-band image LL1 enables decomposing the sub-band image LL1 into sub-band images LL2, HL2, LH2 and HH2 whose horizontal and vertical image sizes are half of those of the sub-band image LL1. Thus, multiple sub-band images LL (LL1, LL2, LL3, . . . ) whose number corresponds to a transform level (number of times of the transforms) can be acquired.

As a method of performing the noise reduction process by using the wavelet transform, a threshold process is known. The threshold process is a method of regarding a component having an amount smaller than a predetermined threshold as a noise and reducing the noise. The threshold process in the wavelet space is performed on the sub-band images HL, HH and LH other than the sub-band images LL and replaces, as expressed by expression (11), a wavelet coefficient $w_{subband}$ (x,y) having an absolute value equal to or less than a threshold $\rho_{subband} \sigma_{subband}$ with zero. This replacement reduces a noise component.

$$w_{subband}(x, y) = \begin{cases} w_{subband}(x, y) & \text{if } |w_{subband}(x, y)| > \rho_{subband}\sigma_{subband} \\ 0 & \text{if } |w_{subband}(x, y)| \leq \rho_{subband}\sigma_{subband} \end{cases} \quad (11)$$

The threshold is set on a basis of a noise amount contained in the high-resolution image. Specifically, a standard deviation is used as the threshold. In expression (11), $\rho_{subband}$ represents a weight parameter.

A noise amount $\sigma_{subband}$ contained in the sub-band image produced by the frequency decomposition of the high-resolution image by the wavelet transform is calculated by expression (12). That is, the noise amount $\sigma_{subband}$ can be calculated from a noise amount $\sigma_0$ contained in the input image not subjected to the resolution enhancement process and an amplification amount $A_{subband}$ of each sub-band image in the resolution enhancement process.

$$\sigma_{subband} = \sqrt{\sigma_0^2 \times A_{subband}} \quad (12)$$

$$A_{subband} = \frac{1}{N} \sum \sum |\lambda^f(u, v)|^2 \cdot |\Psi_{subband}(u, v)|^2 \quad (13)$$

The noise amount $\sigma_0$ contained in the input image is acquired by measurement or estimation performed on the input image. A method is known of, when the noise contained in the input image is a white Gaussian noise uniform in both real and frequency spaces, estimating the noise from a median absolute deviation (MAD) expressed by expression (14):

$$\text{MAD} = \text{median}(|w_{HH1} - \text{median}(w_{HH1})|) \quad (14)$$

The MAD is calculated by using a median (central value) of a wavelet coefficient $w_{HH1}$ of the sub-band image HH1 produced by the wavelet transform performed on the input image. From a relation expressed by expression (15) between the standard deviation and the MAD, the standard deviation of the noise component can be estimated.

$$\sigma_0 = \text{MAD}/0.6745 \quad (15)$$

The amplification amount $A_{subband}$ of each sub-band image in the resolution enhancement process is calculated by expression (13) and is set on a basis of the frequency characteristic $\lambda^f(u,v)$ of the resolution enhancement process. As described above, the frequency characteristic $\lambda^f(u,v)$ of the resolution enhancement process is set from the OTF $H(u,v)$. In expression (13), $\Psi_{subband}(u,v)$ represents a frequency characteristic of the frequency decomposition by the wavelet transform, which is uniquely set from the basis function used in the wavelet transform. In expression (13), N represents number of data of the frequency characteristic $\lambda^f(u,v)$.

The noise amount $\sigma_{subband}$ of each sub-band image produced by decomposing the high-resolution image by the wavelet transform, which is calculated using the above-described method, is based on the amplification amount $A_{subband}$ in the resolution enhancement process. That is, the threshold based on the noise amount $\sigma_{subband}$ is set appropriately for the frequency characteristic $\lambda^f(u,v)$ of the resolution enhancement process. Therefore, using that threshold to the threshold process enables effectively reducing the noise amplified by the resolution enhancement process.

Furthermore, a method is known of creating a noise reduction filter by using an image produced by performing the noise reduction process by the threshold process and applying the filter in the wavelet space.

The noise reduction filter $A_{subband}(x,y)$ is created by expression (16) by using the sub-band image $w_{subband}(x,y)$ provided by the wavelet transform performed on the image subjected to the noise reduction process by the threshold process and using the above-described noise amount $\sigma_{subband}$.

$$\lambda_{subband}(x, y) = \frac{|w_{subband}(x, y)|^2}{|w_{subband}(x, y)|^2 + \sigma_{subband}^2} \quad (16)$$

As in the threshold process, applying the noise reduction filter to the sub-band images other than LL among the sub-band images produced by decomposing the high-resolution image by the wavelet transform enables reducing the noise amplified by the resolution enhancement process.

Moreover, the sub-band images HL, HH and LH subjected to the noise reduction process and the sub-band image LL are recombined by an inverse wavelet transform, and thereby an image whose noise is reduced is produced. The noise-reduced image is an image whose noise amplified by the resolution enhancement process is effectively reduced on the basis of the frequency characteristic of the resolution enhancement process.

Each of the embodiments estimates a noise amount in each of divided areas of each of multiple sub-band images produced by the frequency decomposition of the high-resolution image by the above-described wavelet transform and then performs the noise reduction process. Thereafter, each embodiment recombines the multiple sub-band images whose noises have been reduced together to produce an image whose noise amplified by the resolution enhancement process is reduced.

Example 1

FIG. 1 illustrates a procedure of the image processing method that is an Embodiment 1 (Example 1) of the present invention. The image processing method is executed by a computer constituted by a CPU or the like, which is included in an image processing apparatus, according to an image processing program as a computer program.

The image processing method of this embodiment performs a resolution enhancement process on an input image produced by image capturing using an image capturing optical system and then performs a noise reduction process on a basis of a frequency characteristic of the resolution enhancement process. This embodiment will describe a case of performing an image restoration process as the resolution enhancement process.

At step S101, the computer controls an input image acquirer to acquire a captured image as the input image from an image capturing apparatus such as a camera. The input image from the image capturing apparatus may be acquired through wired or wireless communication between the image capturing apparatus and the image processing apparatus or through a storage medium such as a semiconductor memory or an optical disk. The input image is provided with information (hereinafter referred to as "image capturing condition information") indicating image capturing conditions such as a focal length, an F-number and an image capturing distance (focus lens position) of the image capturing optical system in image capturing. The image capturing conditions further include a pixel size of an image sensor provided to the image capturing apparatus and others.

Figure 2:
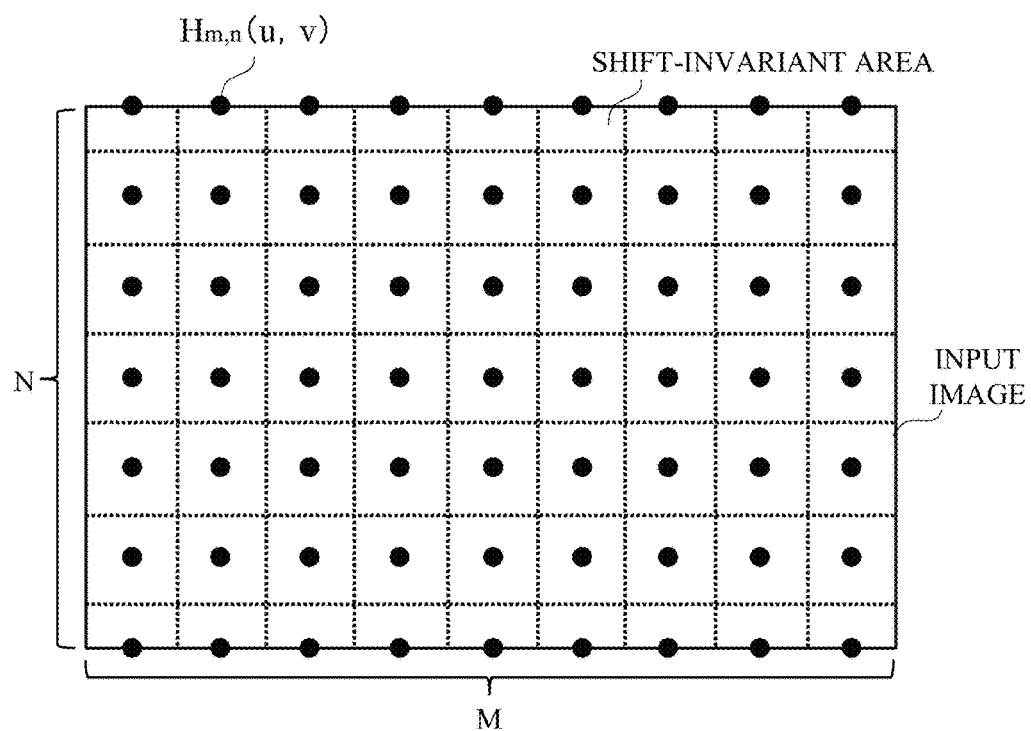
FIG. 2 illustrates shift-invariant areas in an image restoration process and an optical transfer function in Embodiment 1.

FIG. 2 illustrates multiple (M×N) shift-invariant areas provided by dividing the input image into M areas in a horizontal direction and N areas in a vertical direction. An optical characteristic of the image capturing optical system is not uniform in the entire input image (that is, an image pickup plane of the image sensor). However, an optical characteristic of each of narrow areas in the input image can be regarded as being uniform. In this embodiment, the narrow areas are each referred to as "a shift-invariant area", and the processes are performed on each of the shift-invariant areas (m,n). It is desirable to set in advance the shift-invariant areas, taking the optical characteristic of the image capturing optical system into consideration. Dividing the input image into a larger number of the shift-invariant areas each having a reduced size improves accuracy of the later-described image restoration process and others, but increases a processing time and data volume. It is therefore desirable to set the number of the shift-variant areas with consideration of a balance among the processing accuracy, the processing time and the data volume.

Next, at step S102, the computer controls a first noise amount acquirer to calculate the noise amount (first noise amount) $\sigma_0$ contained in the input image. The noise amount $\sigma_0$ contained in the input image is calculated by calculating, by using expression (14), an MAD of a highest-frequency-side sub-band image HH1 among multiple sub-band images produced by performing the wavelet transform on the input image. Alternatively, the noise amount in the input image may be calculated for each of the shift-invariant areas (m,n) in the sub-band image HH1 by calculating the MAD of each shift-invariant area. It is also possible to store, in a memory, noise amount data acquired by measuring in advance a noise amount corresponding to image capturing conditions of the image capturing apparatus such as an ISO sensitivity and a luminance level and acquire, from the stored noise amount data, a noise amount corresponding to the image capturing condition information of the input image and to an average luminance value of each shift-invariant area, as the noise amount in the input image.

As long as before step S105 is executed, step S102 may be executed after steps S103 and S104 are executed.

Next, at step S103, the computer acquires an optical transfer function (OTF) that is the optical characteristic of the image capturing optical system. The OTF is, as expressed by H(u,v), a frequency characteristic of the PSF in a two-dimensional space. That is, the OTF varies in characteristic depending on the PSF. The OTF has a vast number of variations depending on a state of the image capturing optical system. For instance, as for a zoom lens whose focal length is variable, there are various OTFs, the number of which is equal to that of combinations of a focal length, an F value, an image capturing distance, a position on the image sensor (image pickup plane) and a color (wavelength). Furthermore, the OTF has variations corresponding to combinations thereof with characteristics of the image sensor such as a pixel size. Therefore, in practical terms, it is enough to acquire and store only the OTFs corresponding to, among such a large number of the combinations, combinations necessary for the image restoration process. Other OTFs than the stored OTFs (that is, OTFs corresponding to other image capturing conditions than those of the stored OTFs) may be produced by an interpolation process.

Data of the acquired OTFs are calculated by an optical CAD or the like in advance, compiled into a database suitable for the image restoration process and then stored in the memory. It is desirable that positions of the OTF data on the image sensor respectively correspond to the shift-invariant areas illustrated in FIG. 2. The OTF may be alternatively acquired by measurement and may be stored as data in the memory.

The computer acquires, from the acquired input image, the image capturing condition information such as the focal length, the F-number and then the image capturing distance in image capturing and the pixel size. Then, the computer acquires the OTF corresponding to the acquired image capturing condition information from the prestored OTF database.

Next, at step S104, the computer controls a resolution enhancement processor to calculate a frequency characteristic of the resolution enhancement process. Specifically, a user specifies a strength of the image restoration process to cause the computer to calculate, by using the acquired OTF, the frequency characteristic $\lambda^f(u,v)$ of the resolution enhancement process by expression (4).

When the OTF representative of each shift-invariant area (m,n) illustrated in FIG. 2 is $H_{m,n}(u,v)$, expression (4) can be rewritten as follows:

$$\lambda^f_{m,n}(u, v) = \frac{1}{H_{m,n}(u, v)} \frac{|H_{m,n}(u, v)|^2}{(|H_{m,n}(u, v)|^2 + \Gamma_{m,n})} \quad (17)$$

The frequency characteristic $\lambda^f_{m,n}(u,v)$ of the resolution enhancement process can be calculated for each shift-invariant area (m,n) by using expression (17).

The strength of the image restoration process may be specified within, for example, a numerical range of 0 to 100 which is easy to understand for the user. With respect to the numerical range specified by the user, the computer sets a signal amplification amount to be actually applied in the image restoration process. The signal amplification amount is calculated as an absolute value $(|\lambda^f_{m,n}(u,v)|)$ of expression (17) and is controlled using an amplification factor adjustment term $\Gamma_{m,n}$.

The signal amplification amount $|\lambda_{m,n}^f(U,V)|$ may be set, for example, to a value at a specific frequency position (U,V), or to a maximum or average value within a frequency band of $|\lambda_{m,n}^f(U,V)|$.

Next, at step S105, the computer performs the image restoration process on the input image on a basis of the calculated frequency characteristic $\lambda^f_{m,n}(u,v)$ of the resolution enhancement process to acquire (produce) a high-resolution image (first image). In this situation, using the frequency characteristic $\lambda^f_{m,n}(u,v)$ of the resolution enhancement process calculated for each of the shift-invariant areas (m,n) enables performing the image restoration process optimum for each shift-invariant area (m,n). Moreover, using an interpolation process to prevent generation of a block noise or the like at a boundary between the shift-invariant areas enables performing the resolution enhancement process by abetter image restoration process. The image restoration process may be performed alternatively by convoluting the input image with a real space filter acquired by performing an inverse Fourier transform on expression (17). In this case, it is also possible to store a previously-produced real space filter in the OTF database and use the filter.

Next, at step S106, the computer controls a frequency decomposer to perform the wavelet transform (discrete wavelet transform) on the high-resolution image. This process performs frequency decomposition on the high-resolution image to decompose it into multiple sub-band images (second images) as mutually different multiple frequency band components HH, HL, LH and LL, which are illustrated in FIG. 3. The basis function used for the wavelet transform is prestored as sequence data in the memory. The computer selects and acquires one of the stored sequence data as the basis function to perform the wavelet transform. Although this embodiment will describe a case where a transform level is three, the transform level is not limited to three and can be changed.

Figure 4:
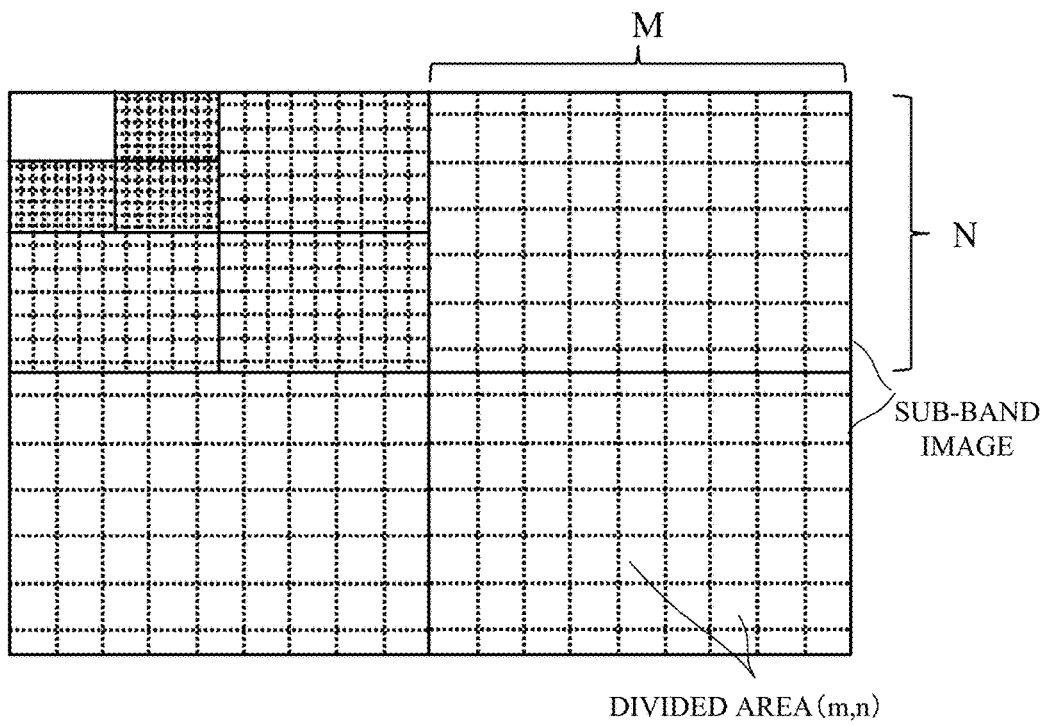
FIG. 4 illustrates areas of each of the sub-band images in Embodiment 1.

Each of the multiple sub-band images produced by the frequency decomposition by the wavelet transform is, as illustrated in FIG. 4, divided into M areas in the horizontal direction and into N areas in the vertical direction in a same manner as when the image restoration process is performed on the divided input image. Each of the divided areas of each sub-band image corresponds to the area resulted by dividing the input image according to the optical characteristic (OTF) of the image capturing optical system. The following process is performed on each of the M×N divided areas (m,n) in each sub-band image.

Next, at step S107, the computer acquires the frequency characteristic $\lambda^f_{m,n}(u,v)$ of the resolution enhancement process performed on each shift-invariant area (m,n) of the input image and calculates an amplification amount $A_{subband}$(m,n) of each divided area (m,n) of each sub-band image. When the real space filter is stored in the OTF database, the amplification amount $A_{subband}$(m,n) stored together with the real space filter may be used, or the amplification amount $A_{subband}$(m,n) may be acquired by performing the Fourier transform on the real space filter.

As described above, since the OTF $\lambda^f_{m,n}(u,v)$ of the image capturing optical system is different in the shift-invariant areas, the resolution enhancement process is performed on the basis of the frequency characteristic $\lambda^f_{m,n}(u,v)$ of each shift-invariant area in the input image. For this reason, the high-resolution image contains a noise amplified on the basis of the frequency characteristic $\lambda^f_{m,n}(u,v)$ of the resolution enhancement process in each shift-invariant area. That is, the noise amplification amount in the resolution enhancement process is not uniform in the multiple divided areas of each sub-band image, in other words, is different in the respective divided areas.

Thus, the computer calculates the amplification amount $A_{subband}$(m,n) in each divided area (m,n) of each sub-band image. Expression (13) can be rewritten as follows:

$$A_{subband}(m, n) = \frac{1}{N_{m,n}} \sum \sum |\lambda^f_{m,n}(u, v)|^2 \cdot |\Psi_{subband}(u, v)|^2 \quad (18)$$

Figure 5:
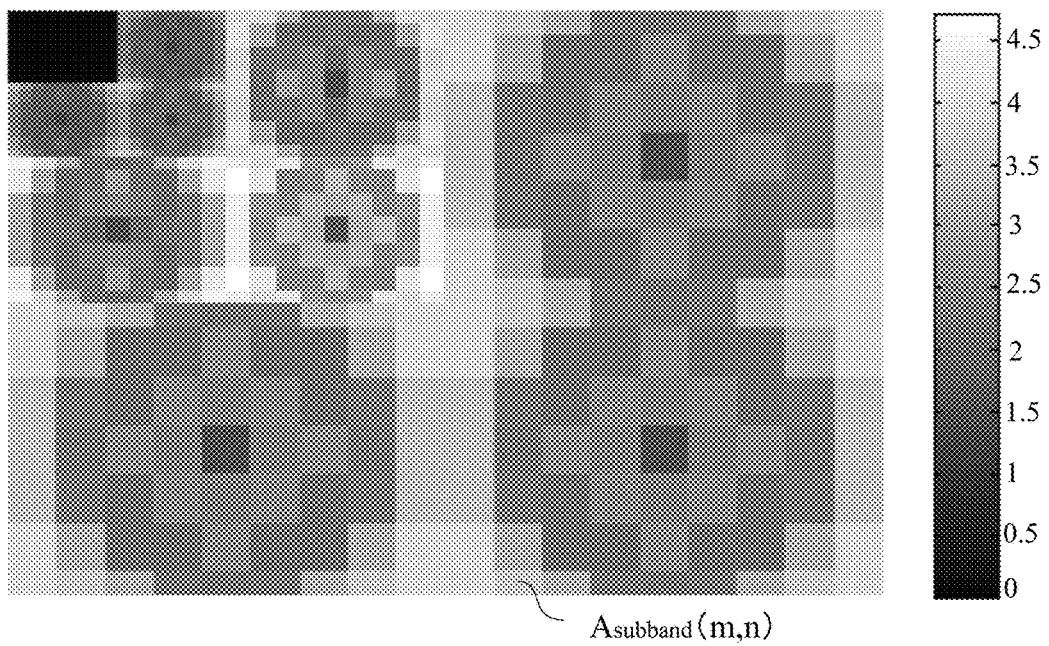
FIG. 5 illustrates an amplification amount in each of the areas of each of the sub-band images in Embodiment 1.

FIG. 5 illustrates an example of a result of calculating the amplification amount $A_{subband}$(m,n) in the divided areas (m,n) of each of the sub-band images.

The computer acquires the frequency characteristic $\Psi_{subband}(u,v)$ of the frequency decomposition by performing the Fourier transform on the sequence of the basis function acquired in the wavelet transform. Alternatively, the computer may acquire the frequency characteristic $\Psi_{subband}(u,v)$ from ones calculated in advance from the sequences of the respective basis functions for the wavelet transform and stored in the memory.

In addition, since the noise reduction process (step S109) described later is performed on the sub-band images other than the sub-band images LL, the calculation of the noise amplification amount (step S107) and a noise amount calculation (step S108) can be omitted for the sub-band images LL.

Next, at step S108, the computer controls a second noise amount calculator to acquire a noise amount (second noise amount) in each divided area (m,n) of each sub-band image. The noise amount herein is a standard deviation of a noise distribution. As described above, the frequency characteristic $\lambda^f_{m,n}(u,v)$ of the resolution enhancement process performed on each shift-invariant area (m,n) of the input image is calculated on a basis of the OTF $H_{m,n}(u,v)$ of the image capturing optical system in each shift-invariant area. For this reason, the noise amount is different in the divided areas of each sub-band image. Therefore, it is necessary to acquire the noise amount $\sigma_{subband}$(m,n) of each divided area (m,n) of each sub-band image on the basis of the frequency characteristic of the resolution enhancement process.

The noise amount $\sigma_{subband}$(m,n) of each divided area (m,n) of each sub-band image is calculated using the noise amount $\sigma_0$ contained in the input image and acquired at step S102 and using the amplification amount $A_{subband}$(m,n) of each divided area of each sub-band image calculated at step S107. Consequently, expression (12) can be rewritten as follows:

$$\sigma_{subband}(m,n) = \sqrt{\sigma_0^2 \times A_{subband}(m,n)} \quad (19)$$

Next, at step S109, the computer controls a noise reduction processor to perform the noise reduction process on each divided area (m,n) of each sub-band image on a basis of the noise amount acquired in each divided area. In this embodiment, the threshold process is used as the noise reduction process.

In the threshold process, the computer first sets a threshold. The threshold is set on the basis of the calculated noise amount by using a weight parameter of $(2 \log(Q_{subband}))^{1/2}$. In the weight parameter, $Q_{subband}$ represents number of data in each sub-band image.

Next, the computer replaces, with reference to the acquired threshold, a wavelet coefficient equal to or less than the threshold among wavelet coefficients $w_{m,n}^{subband}(i,j)$ at positions (i,j) in each divided area (m,n) of each of the sub-band images other than the sub-band image LL, with zero. The computer thus performs the threshold process. In this process, expression (11) can be rewritten as follows:

$$w_{m,n}^{subband}(i, j) = \quad (20)$$
$$\begin{cases} w_{m,n}^{subband}(i, j) & \text{if } |w_{m,n}^{subband}(i, j)| > \sqrt{2\log(Q_{subband})}\, \sigma_{subband}(m, n) \\ 0 & \text{if } |w_{m,n}^{subband}(i, j)| \le \sqrt{2\log(Q_{subband})}\, \sigma_{subband}(m, n) \end{cases}$$

The set threshold is based on the noise amount in each divided area (m,n) of each of the sub-band images calculated at step S108. That is, the noise reduction process by the threshold process is appropriately set for the noise amplification amount in the resolution enhancement process performed on each shift-invariant area of the input image. Therefore, performing the threshold process by using the acquired threshold enables effectively reducing the amplified noise on the basis of the frequency characteristic of the resolution enhancement process in each shift-invariant area.

Next, at step S110, the computer controls a combiner to combine the sub-band images HH, HL and LH subjected to the noise reduction process and the sub-band image LL by an inverse wavelet transform. The computer thereby acquires at step S111 an image (third image) after the noise reduction process. The image after the noise reduction process is an image whose noise amplified by the resolution enhancement process in each shift-invariant area has been effectively reduced on the basis of the frequency characteristic of the resolution enhancement process.

Although this embodiment has described the case of performing the image restoration process as the resolution enhancement process, the image processing method of this embodiment can be basically applied to cases of performing other resolution enhancement processes such as an edge enhancement process and a super-resolution process, as long as the frequency characteristic of the resolution enhancement process is acquired.

Example 2

Figure 6:
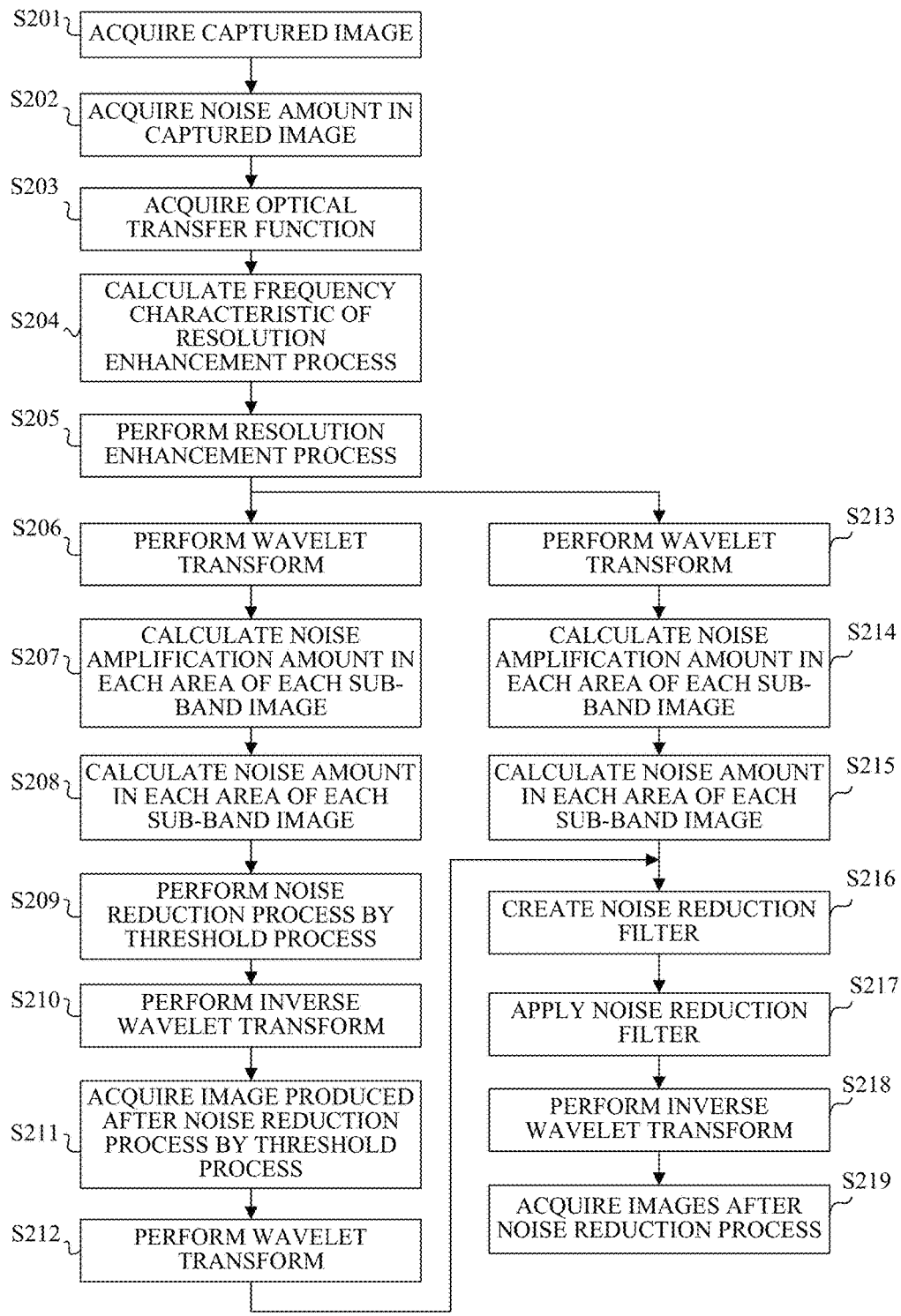
FIG. 6 is a flowchart illustrating a noise reduction process performed in Embodiment 2 of the present invention.

Next, description will be made of an Embodiment 2 (Example 2) of the present invention. Differently from Embodiment 1 using the threshold process as the noise reduction process at step S109 in FIG. 1, this embodiment performs on a high-resolution image a noise reduction process using a noise reduction filter. An image processing method in this embodiment is executed by a computer according to an image processing program in order illustrated in a flowchart of FIG. 6.

The noise reduction filter is created using an image previously subjected to the noise reduction process by the threshold process. Therefore, the computer first performs, at steps S201 to S211, the noise reduction process by the threshold process on the high-resolution image acquired by performing the resolution enhancement process on each shift-invariant area to acquire the image after the noise reduction process. The threshold process in this embodiment is, as described in detail in Embodiment 1, the process to effectively reduce the amplified noise on the basis of the frequency characteristic of the resolution enhancement process in each shift-invariant area.

Next, at step S212, the computer performs a wavelet transform, that is, frequency decomposition on the image acquired by performing the noise reduction process by the threshold process to decompose that image into multiple sub-band images as multiple frequency band components HH, HL, LH and LL. This wavelet transform uses a basis function to be used at step S213 described later. Step S212 may be performed at any timing after step S211 and before step S216. If an identical basis function is used at steps S206 and S213, steps S210 to S212 and steps S214 and S215 may be omitted.

Next, at step S213, the computer performs another wavelet transform, that is, frequency decomposition on the high-resolution image to decompose that high-resolution image into multiple sub-band images as multiple frequency band components HH, HL, LH and LL.

Next, at steps S214 to S215, the computer calculates, on the basis of the frequency characteristic of the resolution enhancement process, an amplification amount $A_{subband}(m, n)$ in each divided area (m,n) of each sub-band image acquired at step S213 to acquire a noise amount $\sigma_{subband}(m,n)$. Since steps S214 and S215 in FIG. 6 in this embodiment are same processes as those at steps S107 and S108 in FIG. 1 in Embodiment 1, a detailed description thereof is omitted.

Next, at step S216, the computer creates a noise reduction filter $\lambda_{m,n}^{subband}(i,j)$. Specifically, the computer creates the filter by using the wavelet coefficient $w_{m,n}^{subband}(i,j)$ of each sub-band image and the noise amount $\sigma_{subband}(m,n)$ of the divided area (m,n) of the sub-band image calculated at step S215. In this process, expression (16) can be rewritten as follows:

$$\lambda_{m,n}^{subband}(i, j) = \frac{|w_{m,n}^{subband}(i, j)|^2}{|w_{m,n}^{subband}(i, j)|^2 + \sigma_{subband}^2(m, n)} \quad (21)$$

When an identical basis function is used at steps S206 and S213, the noise reduction filter may be created using the noise amount calculated at step S208. Since the noise reduction process is performed on the sub-band images other than the sub-band image LL, the creation of the noise reduction filter for the sub-band image LL can be omitted.

Next, at step S217, the computer performs the noise reduction process by applying the noise reduction filter created by the above-described method to each divided area of each sub-band image acquired at step S213 other than the sub-band image LL.

Next, at step S218, the computer combines the sub-band images HH, HL and LH subjected to the noise reduction process and the sub-band image LL together by an inverse wavelet transform. Thereby, at step S219, the computer acquires an image after the noise reduction process.

The created noise reduction filter is based on the calculated noise amount in each divided area (m,n) of each sub-band image. That is, the noise reduction process using the noise reduction filter is appropriately set for the noise amplification amount in the resolution enhancement process performed on each shift-invariant area of the input image. Therefore, performing the noise reduction process by using the created noise reduction filter enables effectively reducing, on the basis of the frequency characteristic of the resolution enhancement process in each shift-invariant area, the noise amplified by the resolution enhancement process.

Example 3

Figure 7:
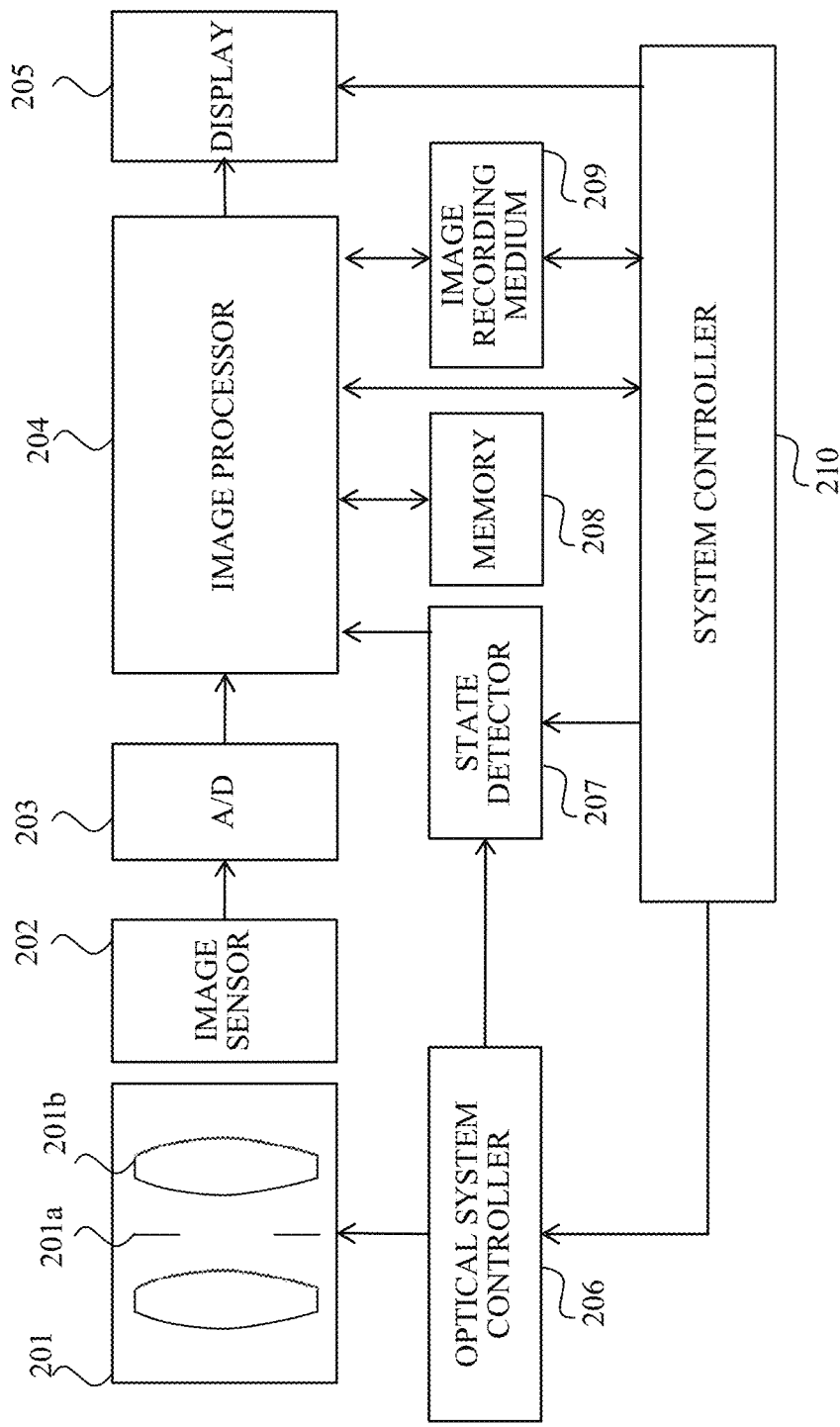
FIG. 7 illustrates an image capturing apparatus including an image processing apparatus that is Embodiment 3 of the present invention.

Next, description will be made of an image capturing apparatus that is an Embodiment 3 (Example 3) of the present invention and includes an image processing apparatus (computer) executing the image processing method (image processing program) of Embodiment 1 or 2. FIG. 7 illustrates a configuration of the image capturing apparatus.

An image sensor 202 capturing an optical image of an object formed by an image capturing optical system 201 converts the optical image into an electrical analog signal to output the analog signal. The analog signal output from the image sensor 202 is converted by an A/D converter 203 into a digital signal. The digital signal is input to an image processor 204.

The image processor 204 performs various image processes on the input digital signal to produce a captured image (input image).

In addition, the image processor 204 displays, on a display 205, a GUI that allows a user to input an instruction of whether or not to perform the resolution enhancement process and the noise reduction process, and another GUI that allows the user to input the strength of the resolution enhancement process. In response to input of the user's instruction to perform the resolution enhancement and noise reduction processes and the strength of the resolution enhancement process through the GUIs, the image processor 204 performs, on the input image, the resolution enhancement and noise reduction processes described in Embodiment 1 or 2. The image processor 204 may be alternatively configured to automatically perform, on the acquired input image, the resolution enhancement and noise reduction processes according to the user's setting to perform these processes and the user's setting of the strength of the resolution enhancement process.

In order to cause the image processor 204 to perform the resolution enhancement process, a state detector 207 acquires image capturing condition information in image capturing for the input image. The state detector 207 may acquire the image capturing condition information from a system controller 210. In addition, the state detector 207 may acquire the image capturing condition information on the image capturing optical system 201 from an optical system controller 206 that controls operation of an aperture stop 201a in the image capturing optical system 201 and movements of a zoom lens (not illustrated) and focus lens 201b therein. The image capturing condition information is added to the input image. The input image is recorded in an image recording medium 209 connected to the image processor 204.

A memory 208 stores information on OTFs for various combinations of image capturing conditions such as a focal length, an F-number and an image capturing distance of the image capturing optical system 201, a position on the image sensor 202 (image pickup plane) and a pixel size of the image sensor 202.

The image processor 204 outputs an output image (third image) produced by the resolution enhancement and noise reduction processes to the image recording medium 209 constituted by a semiconductor memory or an optical disk for recording it thereto and to the display 205 for displaying it thereon.

The above-described series of operations is controlled by the system controller 210 constituted by a CPU, an MPU or the like.

Other Examples

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041541, filed on Mar. 4, 2014 which is hereby incorporated by reference herein in its entirety.

INDUSTRIAL APPLICABILITY

The present invention provides an image processing apparatus and an image capturing apparatus each capable of producing a high-resolution image with less noise.

REFERENCE SIGNS LIST 201 image capturing optical system
202 image sensor
204 image processor

The invention claimed is:

1. An image processing method performed by an image processor, the method comprising the steps of:
   acquiring an input image produced by image capturing using an optical system;
   acquiring a first noise amount present in the input image;
   performing a resolution enhancement process on the input image;
   performing frequency decomposition of the input image into a plurality of decomposed images corresponding to mutually different frequency band components;
   calculating, based on the first noise amount and a frequency characteristic of the resolution enhancement process, a second noise amount present in each of areas of each of the plurality of decomposed images;
   performing a noise reduction process on each area of each of the plurality of decomposed images based on the second noise amount calculated for that area in the calculating step; and
   generating an enhanced-resolution noise-reduced output image by combining the noise-reduced plurality of decomposed images.

2. An image processing method according to claim 1, wherein the resolution enhancement process is performed according to an optical characteristic of the optical system.

3. An image processing method according to claim 1, wherein the noise reduction process is performed on each of the areas of each decomposed image, the areas being divided according to the optical characteristic of the optical system.

4. An image processing method according to claim 1, wherein the first noise amount is acquired from a highest-frequency side image among the plurality of decomposed images.

5. An image processing method according to claim 4, wherein the first noise amount is acquired from each of the areas of the highest-frequency side image, the areas being divided according to the optical characteristic of the optical system.

6. An image processing method according to claim 1, wherein the first noise amount is set by using (a) noise amount data acquired by measurement of a noise amount for a condition of the image capturing and (b) an average luminance value of each of the areas divided according to the optical characteristic of the optical system.

7. An image processing method according to claim 6, wherein the condition of the image capturing includes an ISO sensitivity and a luminance level.

8. An image processing method according to claim 1, wherein the second noise amount is calculated (a) on the basis of the frequency characteristic of the resolution enhancement process in each of the areas divided according to the optical characteristic of the optical system and (b) on a basis of a frequency characteristic of a basis function used for the frequency decomposition.

9. An image processing method according to claim 1, wherein the second noise amount is calculated on a basis of each of noise amplification amounts mutually different in the areas in the resolution enhancement process, each noise amplification amount being calculated (a) on the basis of the frequency characteristic of the resolution enhancement process in each of the areas divided according to the optical characteristic of the optical system and (b) on a basis of a frequency characteristic of a basis function used for the frequency decomposition.

10. An image processing method according to claim 1, wherein the frequency decomposition is performed by a discrete wavelet transform.

11. An image processing method according to claim 1, wherein the resolution enhancement process is performed on each of the areas of each decomposed image, the areas being divided according to the optical characteristic of the optical system.

12. An image processing apparatus comprising:
a memory; and
an image processor connected to the memory and configured to perform processing comprising the steps of:
acquiring an input image produced by image capturing using an optical system;
acquiring a first noise amount present in the input image;
performing a resolution enhancement process on the input image;
performing frequency decomposition of the input image into a plurality of decomposed images corresponding to mutually different frequency band components;
calculating, based on the first noise amount and a frequency characteristic of the resolution enhancement process, a second noise amount present in each of areas of each of the plurality of decomposed images;
performing a noise reduction process on each area of each of the plurality of decomposed images based on the second noise amount calculated for that area in the calculating step; and
generating an enhanced-resolution noise-reduced output image by combining the noise-reduced plurality of decomposed images.

13. An image capturing apparatus comprising:
an image sensor configured to produce an input image by image capturing through an optical system; and
an image processing apparatus comprising:
a memory; and
an image processor connected to the memory and configured to perform processing comprising the steps of:
acquiring an input image produced by image capturing using an optical system;
acquiring a first noise amount present in the input image;
performing a resolution enhancement process on the input image;
performing frequency decomposition of the input image into a plurality of decomposed images corresponding to mutually different frequency band components;
calculating, based on the first noise amount and a frequency characteristic of the resolution enhancement process, a second noise amount present in each of areas of each of the plurality of decomposed images;
performing a noise reduction process on each area of each of the plurality of decomposed images based on the second noise amount calculated for that area in the calculating step; and
generating an enhanced-resolution noise-reduced output image by combining the noise-reduced plurality of decomposed images.

14. A non-transitory computer-readable storage medium storing an image processing program to cause a computer to execute processing comprising the steps of:
acquiring an input image produced by image capturing using an optical system;
acquiring a first noise amount present in the input image;
performing a resolution enhancement process on the input image;
performing frequency decomposition of the input image into a plurality of decomposed images corresponding to mutually different frequency band components;
calculating, based on the first noise amount and a frequency characteristic of the resolution enhancement process, a second noise amount present in each of areas of each of the plurality of decomposed images;
performing a noise reduction process on each area of each of the plurality of decomposed images based on the second noise amount calculated for that area in the calculating step; and
generating an enhanced-resolution noise-reduced output image by combining the noise-reduced plurality of decomposed images.

* * * * *